(No Model.)

R. E. CLARK.
COTTON CHOPPER AND CULTIVATOR.

No. 354,689. Patented Dec. 21, 1886.

WITNESSES:
D. D. Mott
C. Sedgwick

INVENTOR:
R. E. Clark
BY Munn & Co
ATTORNEYS.

UNITED STATES PATENT OFFICE.

ROBBERT EMMETT CLARK, OF FORT MOTTE, SOUTH CAROLINA.

COTTON CHOPPER AND CULTIVATOR.

SPECIFICATION forming part of Letters Patent No. 354,689, dated December 21, 1886.

Application filed June 11, 1886. Serial No. 204,856. (No model.)

*To all whom it may concern:*

Be it known that I, ROBBERT EMMETT CLARK, of Fort Motte, in the county of Orangeburg and State of South Carolina, have invented a new and Improved Cotton Chopper and Cultivator, of which the following is a specification, reference being had to the annexed drawings, forming a part thereof, in which—

Figure 1:
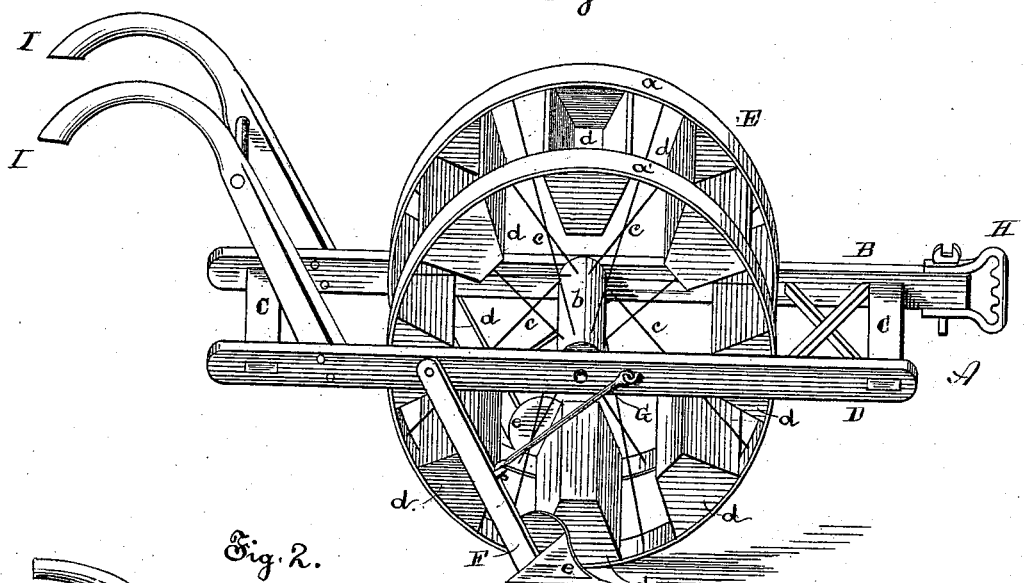
Figure 2:
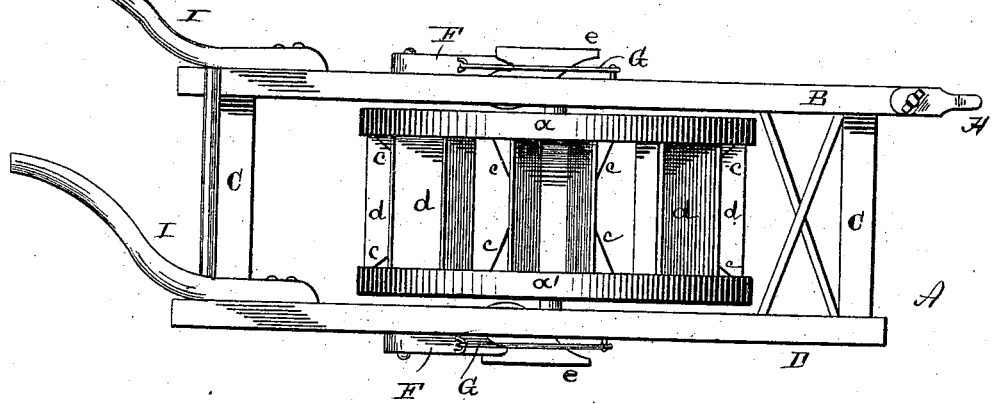

Figure 1 is a perspective view of my improved cotton chopper and cultivator. Fig. 2 is a plan view.

Similar letters of reference indicate corresponding parts in both figures of the drawings.

My invention relates to improvements in that class of cotton-choppers in which the stalks to be left standing are covered up while plows throw earth upon and crush down the remaining uncovered stalks; and the invention consists in the peculiar construction and arrangement of parts, as herein fully described, and pointed out in the claims.

The frame A of my improved cotton chopper consists of the beam B, two cross-bars, C, and the side bar, D, secured together in any convenient and suitable way. In the frame thus formed, at or near the middle of its length, is journaled a wheel, E, formed of two rims, a a', connected with a long hub, b, by means of light spokes c, preferably made of iron or steel, each pair of spokes being arranged so as to cross each other and thus brace the wheel laterally. At equally distant points around the periphery of the wheel are secured plant-covers d, which are preferably made of trapezoidal form in cross-section, with the open and outer side of the cover wider than the inner and closed side. The rims a a' are connected by the covers, so that the rims, covers, and crossed spokes make a rigid but light wheel. The distance between the covers d is equal to the required distance between the plants which are to remain standing.

To the beam B and bar D, and on opposite sides of the frame A, are pivoted plow-standards F, which are held in a working position by braces G, connected with the beam and side bar, and hooking into eyes projecting from the forward edges of the standards. To the lower ends of the standards F are secured plows e, which are oppositely arranged with respect to each other, with their mold-boards toward the wheel E.

To the forward end of the beam B is secured an ordinary clevis, H, and to the beam B and bar D, near their rear ends, are secured curved handles I, which are offset to enable the driver to walk about opposite the rear end of the beam B while guiding the implement. The arrangement of the clevis H upon one side of the machine enables the horse drawing the machine to walk between the rows of plants. As the machine is drawn forward, the covers d, one after the other, shut down over and cover one or more plants, and the plows e throw the earth between adjoining covers d, burying the plants not protected by the covers, while those protected by the covers will be allowed to stand.

When it is desired to transport the machine from one place to another, the braces G are unhooked and the plows e are lifted out of contact with the ground.

If desirable, the braces G may be placed behind the plow-standards instead of in front, and they may be arranged both before and behind the standard, if necessary.

In lieu of the clevis arrangement described for securing its side draft, I may employ chains connected with the forward ends of both beams B D, and arranged relative to each other at the angle required to secure the side draft.

Having thus described my invention, what I claim as new, and desire to secure by Letters Patent, is—

1. In a cotton-chopper, the protector-wheel E, consisting of the rims a, the elongated hub b, the spokes c, and the elongated covers d, secured to the said rims, substantially as herein shown and described.

2. In a cotton-chopper, the combination, with the frame B D C, of the double rim-wheel E, journaled in the said frame, and provided with the elongated covers d, secured to the rims of the wheel, and the plow-standards F, substantially as herein shown and described.

ROBBERT EMMETT CLARK.

Witnesses:
WALTER W. WOLFE,
E. B. PETERKIN.